(12) United States Patent
Carr

(10) Patent No.: US 6,764,275 B1
(45) Date of Patent: Jul. 20, 2004

(54) FLUID DISPLACEMENT ROTATIONAL ASSEMBLY

(76) Inventor: Dennis L. Carr, 1142 E 20th St., Loveland, CO (US) 80538

( * ) Notice: Subject to any disclaimer, the term of this patent is extended or adjusted under 35 U.S.C. 154(b) by 81 days.

(21) Appl. No.: 10/185,706

(22) Filed: Jun. 28, 2002

(51) Int. Cl.$^7$ .................................................. F03B 7/00
(52) U.S. Cl. ............................. 415/1; 415/916; 416/84; 60/639
(58) Field of Search ........................... 415/1, 126, 128, 415/168.1, 916; 416/84, 139, 140; 60/639

(56) References Cited

U.S. PATENT DOCUMENTS

| | | | |
|---|---|---|---|
| 29,149 A | 7/1860 | Durham | |
| 1,708,807 A | * 4/1929 | Tatay | ........................... 40/440 |
| 3,412,482 A | 11/1968 | Kusmer | |
| 3,934,964 A | 1/1976 | Diamond | |
| 4,254,622 A | 3/1981 | Denson, Sr. | |
| 4,363,212 A | 12/1982 | Everett | |
| 4,385,497 A | * 5/1983 | Scott | ........................... 60/639 |
| 4,407,130 A | 10/1983 | Jackson | |
| 4,498,294 A | 2/1985 | Everett | |
| 4,570,444 A | * 2/1986 | Gould | ........................... 60/675 |
| 5,372,474 A | 12/1994 | Miller | |
| 5,944,480 A | 8/1999 | Forrest | |
| 5,996,344 A | 12/1999 | Frenette et al. | |
| 6,009,707 A | 1/2000 | Alkhamis | |
| 6,115,950 A | 9/2000 | Al-Mutairi | |
| 6,353,270 B1 | 3/2002 | Sen | |

* cited by examiner

Primary Examiner—Ninh H. Nguyen

(57) ABSTRACT

A fluid displacement rotational assembly includes a frame, a support structure supporting the frame for rotating an axle connected to the frame, chamber members coupled to the frame and each chamber member being arranged diametrically opposed by an associated one of the plurality of chamber members to form a plurality of diametrically opposed chamber member pairs, a plurality of conduits coupled to extend between the chamber members of the diametrically opposed chamber member pairs such that the chamber members of each diametrically opposed chamber member pair are in environmental communication with each other, a plurality of pistons slidably mounted in the chamber members such that the pistons in each diametrically opposed chamber member pair form a fluid chamber between each piston of the diametrically opposed chamber member pair and extending through the conduit of the diametrically opposed chamber member pair, and a fluid positioned in each fluid chamber.

20 Claims, 8 Drawing Sheets

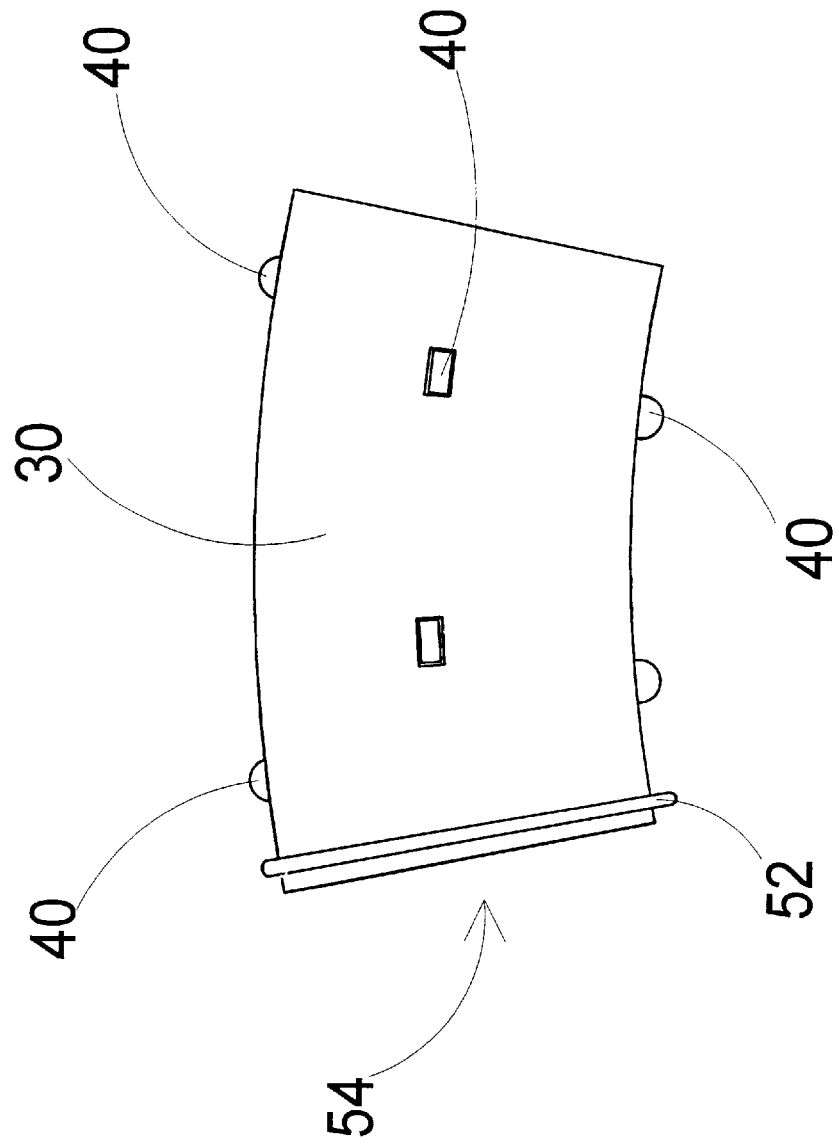

FLUID DISPLACEMENT ROTATIONAL ASSEMBLY

BACKGROUND OF THE INVENTION

1. Field of the Invention

The present invention relates to power generators and more particularly pertains to a new fluid displacement rotational assembly for providing highly efficient rotational energy production.

2. Description of the Prior Art

The use of power generators is known in the prior art. U.S. Pat. No. 5,372,474 to-Miller describes a gravity assisted rotation device. Another type of power generator is U.S. Pat. No. 3,934,964 issued to Diamond providing rotation using a combination of gravitational and buoyant forces. Also using gravitational and buoyant forces are U.S. Pat. No. 3,412,482 to Kusmer, U.S. Pat. No. 6,115,950 to Al-Mutairi, U.S. Pat. No. 4,363,212 to Everett, U.S. Pat. No. 5,944,480 to Forrest, U.S.

Pat. No. 5,996,344 to Frenette et-al., U.S. Pat. No. 4,498,294 Everett, U.S. Pat. No. 6,009,707 Alkhamis, U.S. Pat. No. 4,254,622 Denson, Sr., U.S. Pat. No. 4,407,130 Jackson, U.S. Pat. No. 29,149 to Durham, and U.S. Pat. No. 6,353,270 to Sen.

While these devices fulfill their respective, particular objectives and requirements, the need remains for a device that increases the efficiency of energy production.

SUMMARY OF THE INVENTION

The present invention meets the needs presented above by providing a frame coupled to an axle, a support structure supporting the frame such that the frame is rotatable to rotate the axle, a plurality of chamber members coupled to the frame and arranged around a perimeter of the frame diametrically opposed by an associated one of the plurality of chamber members to form a plurality of diametrically opposed chamber member pairs, a plurality of conduits coupled to extend between the chamber members of an associated one of the diametrically opposed chamber member pairs such that the chamber members of each diametrically opposed chamber member pair are in environmental communication with each other, a plurality of pistons slidably mounted in the chamber members such that the pistons in each diametrically opposed chamber member pair form a fluid chamber between each piston of the diametrically opposed chamber member pair and extending through the conduit of the diametrically opposed chamber member pair, and a quantity of fluid positioned in each fluid chamber.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is a side view of the piston of the second embodiment of the present invention.

DESCRIPTION OF THE PREFERRED EMBODIMENT

Figure 1:
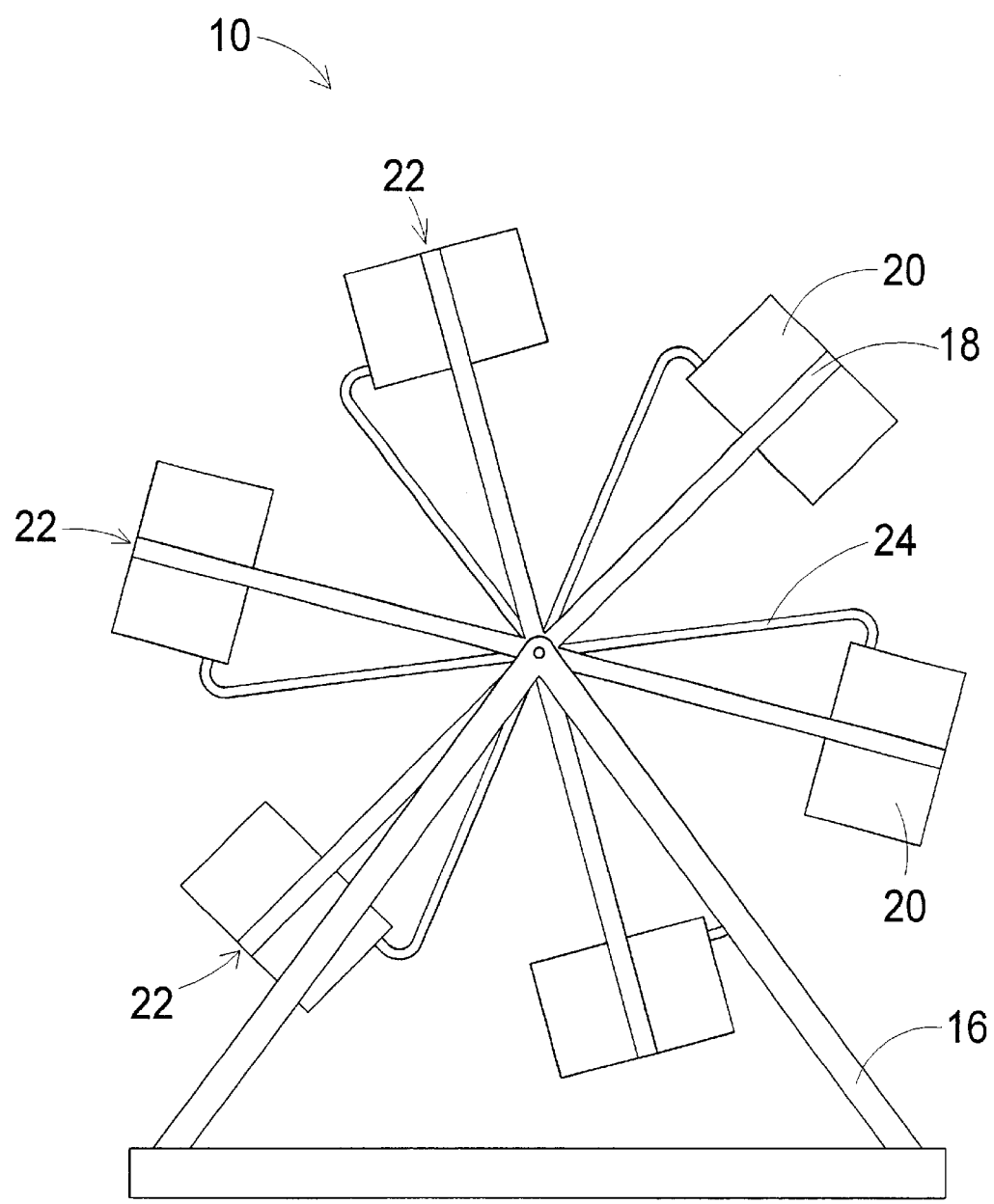
FIG. 1 is a side view of a new fluid displacement rotational assembly according to the present invention.
Figure 2:
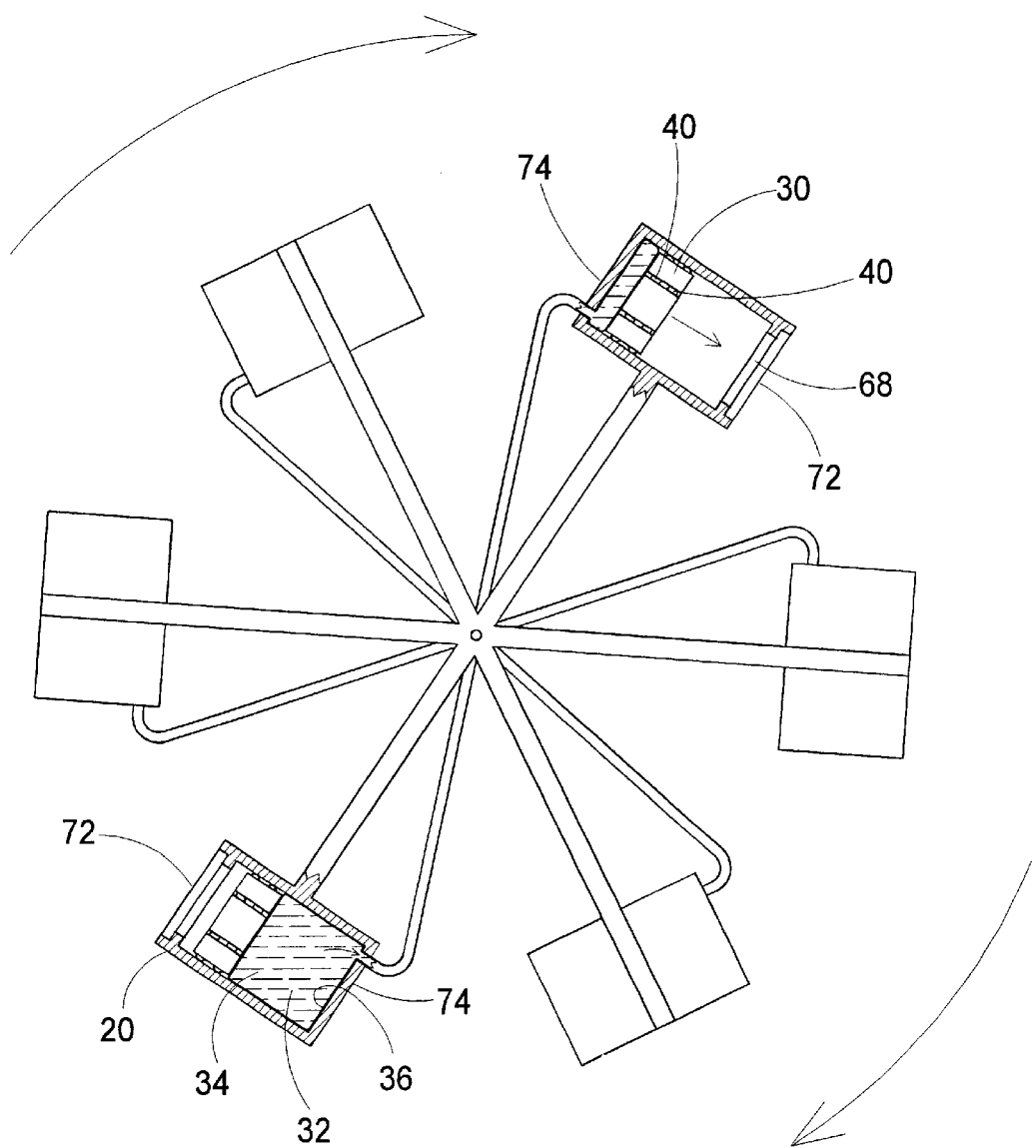
FIG. 2 is a partial cut-away view of the present invention.
Figure 3:
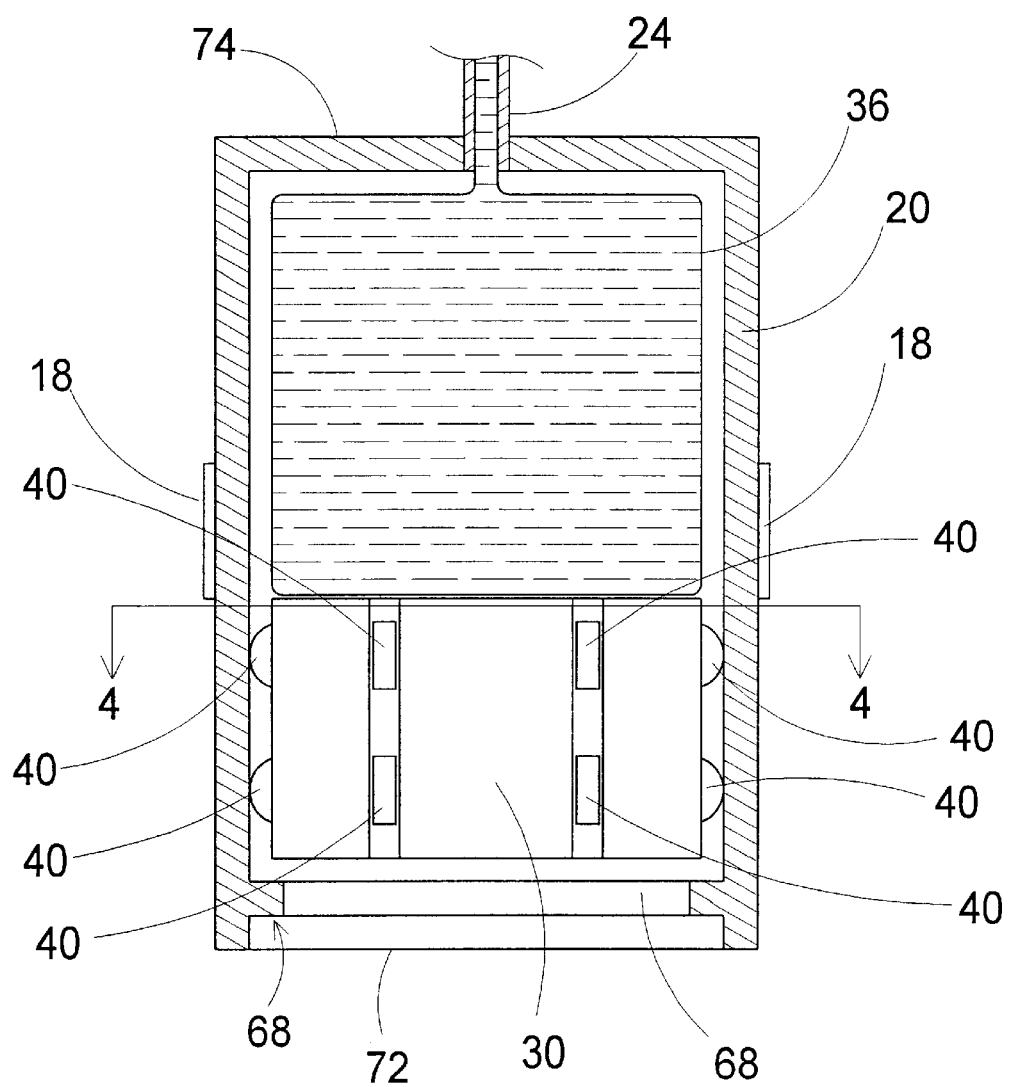
FIG. 3 is a cross-sectional view of a chamber member and piston of the present invention.
Figure 4:
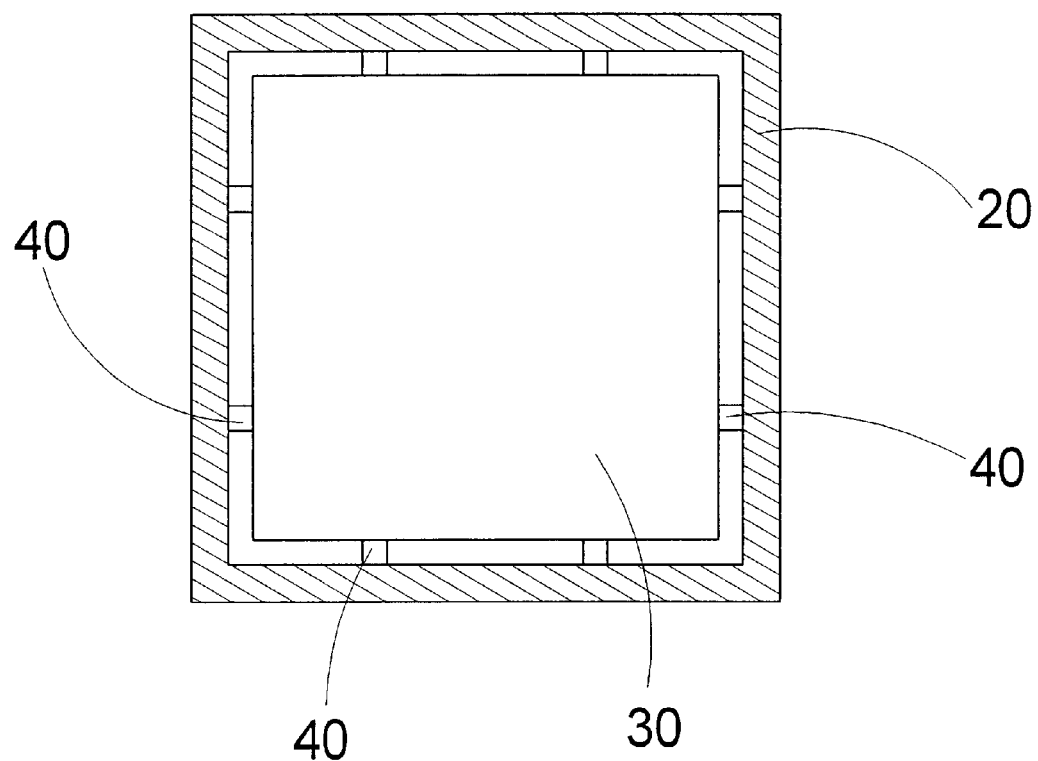
FIG. 4 is a cross-sectional view of the present invention taken along line 4—4 of FIG. 3.

With reference now to the drawings, and in particular to FIGS. 1 through 8 thereof, a new fluid displacement rotational assembly embodying the principles and concepts of the present invention and generally designated by the reference numeral 10 will be described.

Figure 5:
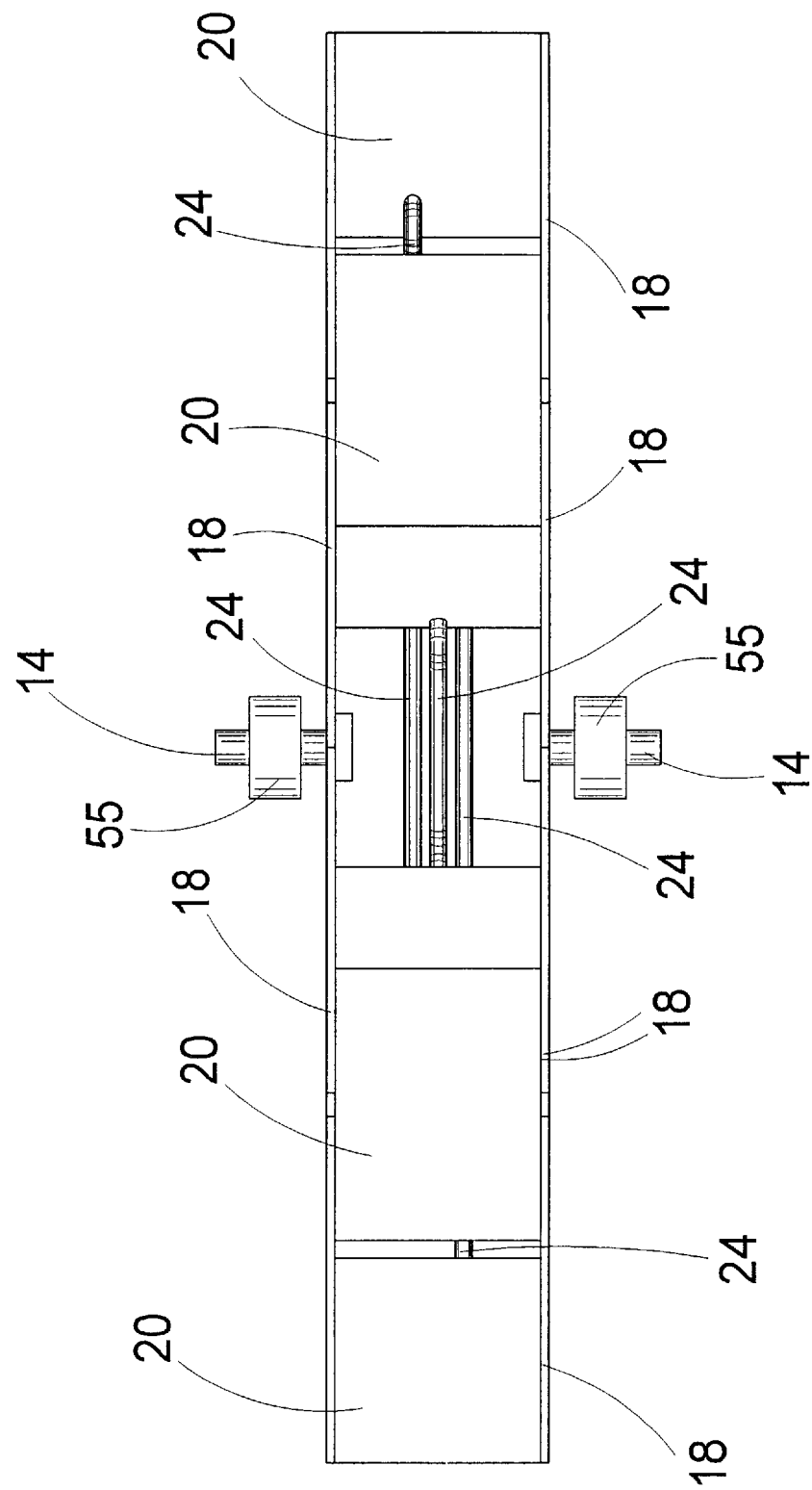
FIG. 5 is a top view of the present invention.
Figure 6:
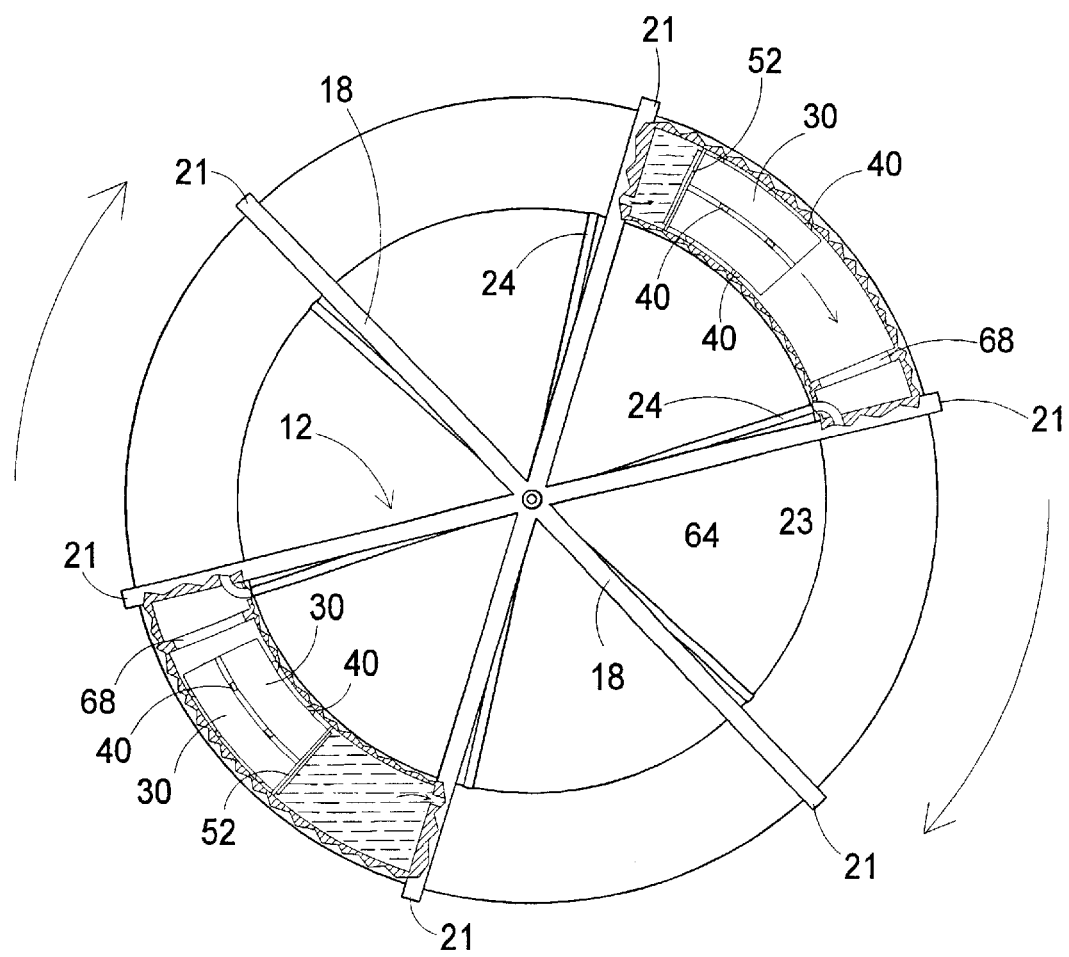
FIG. 6 is a partial cut-away view of a second embodiment of the present invention.

As best illustrated in FIGS. 1 through 8, the fluid displacement rotational assembly 10 generally comprises a frame 12 coupled to an axle 14. The frame 12 includes a support structure 16 supporting rotatable opposite side portions 18 of the frame 12 such that the side portions 18 are rotatable to rotate the axle 14. Typically, as shown in FIG. 5, a split axle construction is employed using bearings 55.

Chamber members 20 are coupled to the frame 12. Specifically, the chamber members 20 are coupled to the side portions 18. The chamber members 20 are arranged radially around a perimeter of the frame 12. Each of the chamber members 20 is diametrically opposed by an associated one of the plurality of chamber members 20 to form a plurality of diametrically opposed chamber member pairs 22.

A plurality of conduits 24 are provided. Each conduit 24 is coupled to extend between the chamber members 20 of an associated one of the diametrically opposed chamber member pairs 22 such that the chamber members 20 of each the diametrically opposed chamber member pairs 22 are in environmental communication with each other.

A plurality of pistons 30 are provided. Each piston 30 is slidably mounted in an associated one of the chamber members 20 such that the pistons 30 in each diametrically opposed chamber member pair 22 form a fluid chamber 32 between each piston 30 of the diametrically opposed chamber member pair 22 and through the associated conduit 24 of the diametrically opposed chamber member pair 22.

A quantity of fluid 34 is positioned in each fluid chamber 32. Typically, the fluid is water and excess air is removed from the fluid chamber 32. Thus, urging of the fluid into the chamber member on the downwardly rotating side of the frame 12 is accomplished by the piston on the downwardly rotating side moving downward and pulling the fluid through the conduit as well as the downward movement of the piston on the upwardly rotating side pushing the fluid down and out into the conduit.

In one embodiment, a collapsible membrane 36 is positioned in each chamber member 20 between the piston 30 and the conduit 24 to enclose each fluid chamber 32. Alternately, a low friction seal is coupled to each piston adjacent an end of the piston closest to the conduit to prevent the fluid from flowing past the piston.

A plurality of roller members 40 are coupled to each piston 30 for facilitating sliding of each piston 30 in the associated chamber member 20. The rollers are most preferably distributed symmetrically around an outer perimeter surface of the piston. The piston most preferably has a square cross-sectional footprint.

Each chamber member preferably has an open end 72 and a closed end 74. The conduit attaches to the closed end and the open end permits easier maintenance of the chamber members, membranes and pistons. A stopping flange 68 is positioned to extend around an inner perimeter of each chamber member 20 to prevent the piston from exiting the chamber member.

Figure 7:
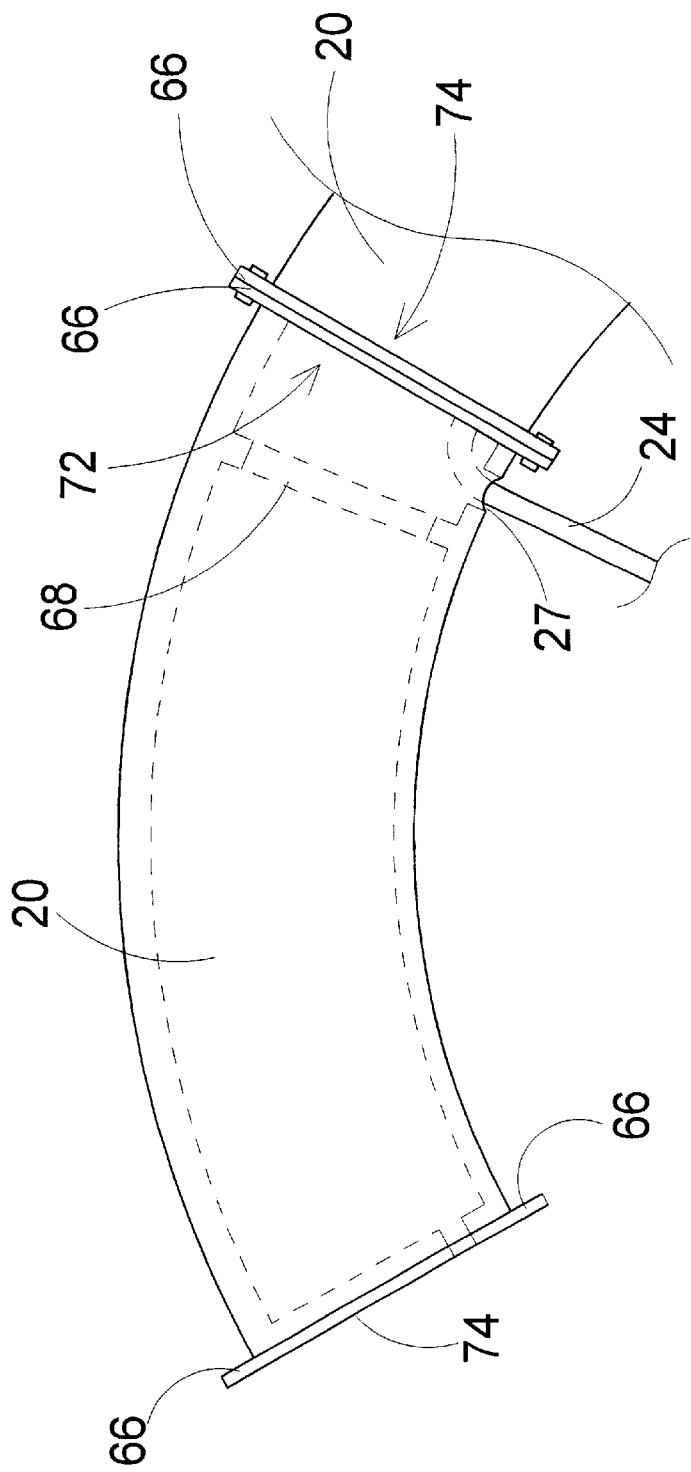
FIG. 7 is an enlarged partial cut-away view of the second embodiment of the present invention.

Each of the conduits is substantially S-shaped with opposite ends coupled to a trailing end of the chamber members relative to the direction of rotation of the frame. The chamber members are oriented such that the trailing end will correspond to the closed end A second embodiment provides arcuate chamber members and couples the chamber members in series to form an annular shape. The second embodiment incorporates structure similar to the first structure and all features of the first embodiment that are not rendered physically impossible by the annular shape and interconnection of the chamber members may also be employed in the second embodiment. In the second embodiment, the frame 12' has a pair of side portions 18' and each side portion 18' includes a hub 64 and a plurality of arms 23 extending outwardly from the hub 64. Each chamber member 20' is coupled to distal ends 21 of an associated aligned pair of arms 23 of the side portions 16' of the frame 12'. In the second embodiment, each chamber member is arcuate and positioned such that a center of curvature of each chamber is aligned with a longitudinal axis of rotation of the axle 14. The plurality of chamber members 20' are aligned to form an annular shape. A plurality of connection flanges 66 extend from ends of the plurality of chamber members 20' for facilitating connection of each chamber member 20' to an adjacently positioned chamber member 20' using clamps or bolts. Additionally, the connection flanges may be employed to facilitate connection of the chamber members 20' to the frame 12. In the second embodiment, each piston 30' has rollers 40' and a seal 52 positioned adjacent to an end of the piston 30' to form a seal end 54 positioned adjacent to the fluid chamber 32' such that a weight of the piston 30' urges the fluid between the chamber members 20' through the conduits 24' as the frame 12' rotates. Each chamber member 20' also has an open end 72' and a closed end 74'. A stopping flange 68' is employed to prevent the piston 30' from contacting the conduit extending into the chamber member 20' as seen in FIG. 7. Each chamber member 20' has an aperture 27 for receiving the conduit that is coupled to the closed end of the adjacently positioned chamber member. The aperture 27 has a diameter greater than the outer diameter of the conduit to permit airflow through the aperture to vent the space between the piston 30' and the adjacently positioned chamber member.

In use, the device is rotated to impart a rotational energy to the axle. The fluid is discharged from the chamber members on a first side of the frame by the pistons on the first side of the frame pushing down on an upwardly facing side of each fluid chamber to force the fluid through the conduits to a second side of the frame member. The frame, and thus the axle continue by the repeated transfer of fluid between the first and second sides of said frame thereby greatly enhancing the efficiency of a generator coupled to the axle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rotation device comprising:

a frame coupled to an axle;

a support structure supporting said frame such that said frame is rotatable to rotate said axle;

a plurality of chamber members coupled to said frame, said chamber members being arranged around a perimeter of said frame, each of said chamber members being diametrically opposed by an associated one of said plurality of chamber members to form a plurality of diametrically opposed chamber member pairs;

a plurality of conduits, each conduit being coupled to extend between said chamber members of an associated one of said diametrically opposed chamber member pairs such that said chamber members of each said diametrically opposed chamber member pair are in environmental communication with each other;

a plurality of pistons, each piston being slidably mounted in an associated one of said chamber members such that said pistons in each diametrically opposed chamber member pair form a fluid chamber between each piston of said diametrically opposed chamber member pair said associated conduit of said diametrically opposed chamber member pair;

a quantity of fluid positioned in each fluid chamber; and a collapsible membrane enclosing and defining a fluid chamber and being positioned in each said chamber member between said piston and said conduit.

2. The rotation device of claim 1 further comprising:
   means on each piston for facilitating sliding movement of said piston in the associated one of said chamber members.

3. The rotation device of claim 2 wherein said means on each piston for facilitating sliding movement comprises a plurality of roller members coupled to said piston.

4. The rotation device of claim 1 wherein each said chamber member is arcuate.

5. The rotation device of claim 4 wherein said plurality of chamber members are aligned to form an annular shape.

6. The rotation device of claim 5, further comprising:
   each piston having a seal end positioned adjacent to said fluid chamber such that a weight of said piston urges said fluid between said chamber members through said conduits as said frame rotates.

7. The rotation device of claim 1 wherein each of said conduits is substantially S-shaped.

8. The rotation device of claim 1 wherein each of said chamber members has a substantially square cross-section.

9. The rotation device of claim 1 wherein said frame has a pair of side portions, each side portion including a hub and a plurality of arms extending outwardly from said hub;
   each said chamber member being coupled to distal ends of an associated aligned pair of arms of said side portions.

10. The rotation device of claim 1 wherein said fluid is water.

11. A rotation device comprising:
    a frame coupled to an axle;
    a support structure supporting said frame such that said frame is rotatable to rotate said axle;
    a plurality of chamber members coupled to said frame, said chamber members being arranged around a perimeter of said frame, each of said chamber members being diametrically opposed by an associated one of said plurality of chamber members to form a plurality of diametrically opposed chamber member pairs;
    a plurality of conduits, each conduit being coupled to extend between said chamber members of an associated one of said diametrically opposed chamber member pairs such that said chamber members of each said diametrically opposed chamber member pair are in environmental communication with each other;
    a plurality of pistons, each piston being slidably mounted in an associated one of said chamber members such that said pistons in each diametrically opposed chamber member pair form a fluid chamber between each piston of said diametrically opposed chamber member pair said associated conduit of said diametrically opposed chamber member pair;
    a quantity of fluid positioned in each fluid chamber; and
    a plurality of roller members coupled to each piston for facilitating sliding of each said piston in said associated chamber member.

12. A rotation device comprising:
    a frame coupled to an axle;
    a support structure supporting said frame such that said frame is rotatable to rotate said axle;
    a plurality of chamber members coupled to said frame, said chamber members being arranged around a perimeter of said frame, each of said chamber members being diametrically opposed by an associated one of said plurality of chamber members to form a plurality of diametrically opposed chamber member pairs;
    a plurality of conduits, each conduit being coupled to extend between said chamber members of an associated one of said diametrically opposed chamber member pairs such that said chamber members of each said diametrically opposed chamber member pair are in environmental communication with each other;
    a plurality of pistons, each piston being slidably mounted in an associated one of said chamber members such that said pistons in each diametrically opposed chamber member pair form a fluid chamber between each piston of said diametrically opposed chamber member pair said associated conduit of said diametrically opposed chamber member pair;
    a quantity of fluid positioned in each fluid chamber;
    wherein each said chamber member is arcuate;
    wherein said plurality of chamber members are aligned to form an annular shape; and
    a plurality of flanges, each flange extending an end of an associated one of said plurality of chamber members for facilitating connection of each chamber member to an adjacently positioned chamber member.

13. A method of rotating an axle coupled to a frame, said frame being coupled to a plurality of chamber members, diametrically opposed chamber members being environmentally coupled to each other by a conduit to form a plurality of fluid chambers, pistons being positioned in each chamber member on opposite sides of each said fluid chamber for urging a fluid between said diametrically opposed chamber members, the steps of the method comprising:
    rotating said frame to impart a rotational energy to said axle;
    discharging said fluid from said chamber members on a first side of said frame by said pistons on said first side of said frame pushing down on an upwardly facing side of each said fluid chamber forcing said fluid through said conduits to a second side of said frame member; and
    continuing to rotate said axle by the repeated transfer of fluid between said first and second sides of said frame;
    wherein said piston includes a sealing end positioned adjacent to said fluid chamber.

14. The method of claim 13 wherein said fluid is water.

15. The method of claim 13 wherein a plurality of rollers are coupled to outer sides of each said piston to facilitate movement of each said piston in said chamber members.

16. The method of claim 13 additionally comprising means on each piston for facilitating sliding movement of said piston in the associated one of said chamber members.

17. The method of claim 13 wherein a collapsible membrane is positioned in each said chamber member between said piston and said conduit.

18. A rotation device comprising:
    a frame coupled to an axle;
    a support structure supporting said axle in a manner such that said axle and said frame are rotatable with respect to said support structure;
    an annular housing comprised of a plurality of chamber members connected together end to end in a ring, said annular housing being coupled to said frame, each of said chamber members being diametrically opposed by an associated one of said plurality of chamber members to form a plurality of diametrically opposed chamber member pairs;

a plurality of conduits, each conduit being coupled to extend between said chamber members of an associated one of said diametrically opposed chamber member pairs such that said chamber members of each said diametrically opposed chamber member pair are in fluid communication with each other;

a plurality of pistons, each piston being slidably mounted in an associated one of said chamber members such that said pistons in each diametrically opposed chamber member pair form a fluid chamber between each piston of said diametrically opposed chamber member pair said associated conduit of said diametrically opposed chamber member pair;

a quantity of fluid positioned in each fluid chamber;

each of said chamber members being arcuate between ends of said chamber member such that said piston associated with said chamber member moves along a circular path concentric with said annular housing as said piston slides and as said annular housing rotates on said support structure.

19. The rotation device of claim 18 wherein a center of gravity of each of said pistons moves along said circular path without deviating from said circular path as said piston slides and as said annular housing rotates on said support structure.

20. The rotation device of claim 18 wherein a center of gravity of each of said pistons moves along said circular path without oscillation of said piston as said piston slides and as said annular housing rotates on said support structure.

* * * * *